Nov. 26, 1968  C. J. SNYDER  3,413,649
LINE RECORDER HAVING PRINTED CHARACTER VERNIER
Filed Nov. 29, 1966  2 Sheets-Sheet 1

WITNESSES

INVENTOR
Carl J. Snyder.
BY
ATTORNEY

Nov. 26, 1968   C. J. SNYDER   3,413,649
LINE RECORDER HAVING PRINTED CHARACTER VERNIER
Filed Nov. 29, 1966   2 Sheets-Sheet 2
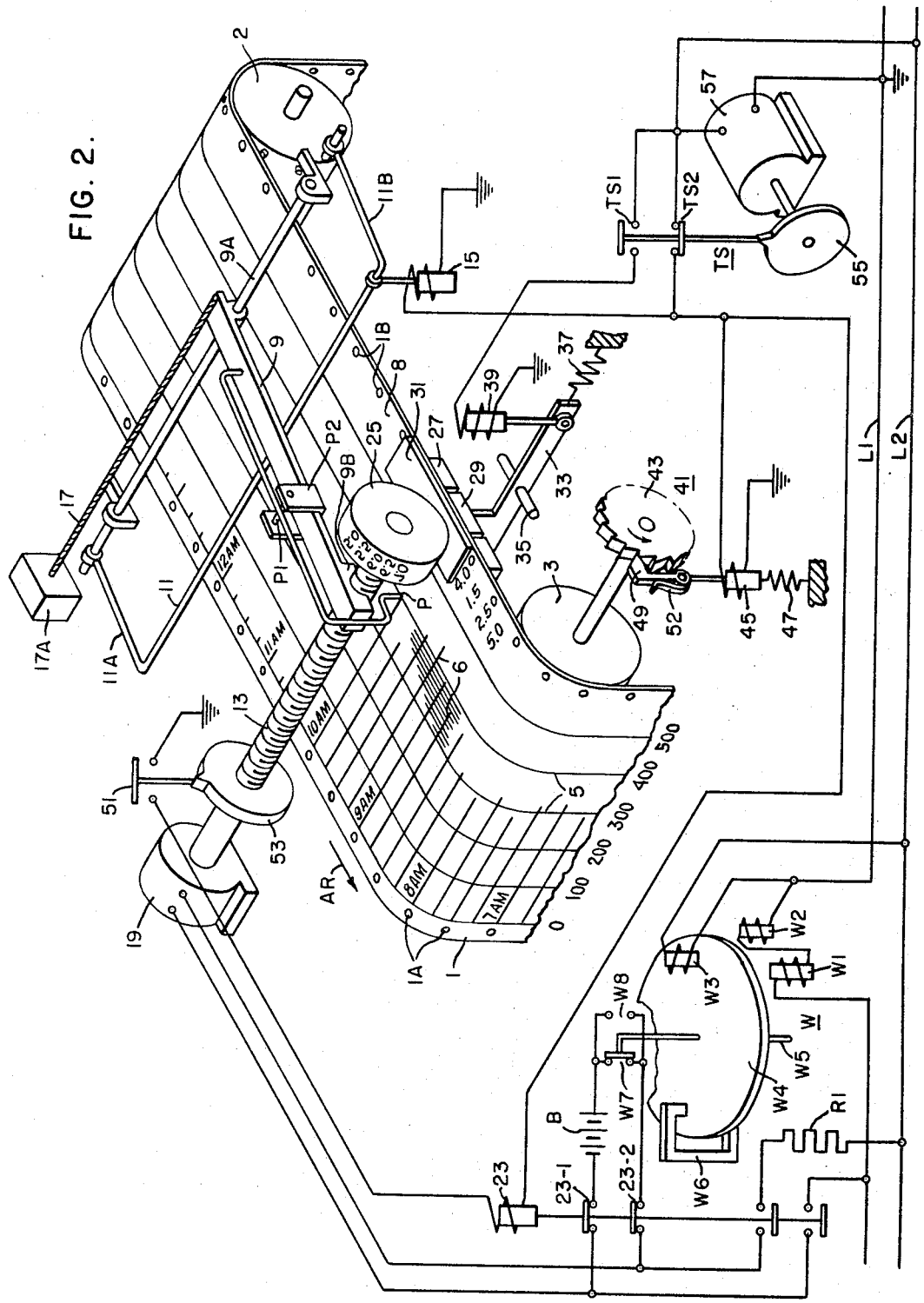

3,413,649
LINE RECORDER HAVING PRINTED CHARACTER VERNIER
Carl J. Snyder, Raleigh, N.C., assignor to Westinghouse Electric Corporation, Pittsburgh, Pa., a corporation of Pennsylvania
Filed Nov. 29, 1966, Ser. No. 597,730
1 Claim. (Cl. 346—30)

ABSTRACT OF THE DISCLOSURE

A strip chart recorder applies a printed character to the margin adjacent the terminus of each recorded line. This printed character in effect supplies a vernier measurement of the terminal portion of the line.

---

Figure 1:
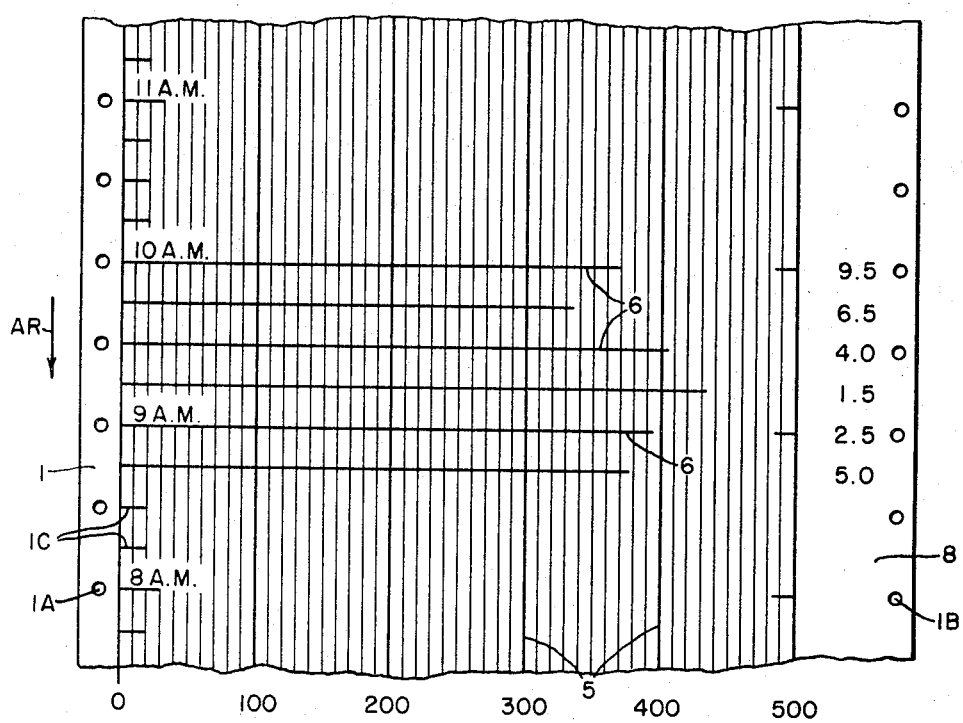

This invention relates to measuring devices for recording variable quantities and in particular to devices for recording the maximum demand for power from an electric power source occurring during a particular time period or demand interval.

There is a need in the electric power industry for devices known as demand recorders which will make a written record of the varying rate of power flow to a customer throughout a predetermined time such as that between successive billings.

Several types of demand recorders are available on the market. One of these provides a chart on which is plotted curves showing the demand for power during each successive demand interval throughout the billing period. Various demand intervals have been employed. For example the demand interval may have a duration of 15 minutes, 30 minutes or 60 minutes. For present purposes it will be assumed that a 15 minute demand interval is employed. Another type of demand recorder provides a printed tabulation of the demand occurring for each of the demand intervals.

The chart type of demand recorder has an advantage over the printing type in that it is possible to tell rapidly the date in the billing period and the specific time during which the maximum demand occurred. A disadvantage of the chart type demand recorder is that in a device of reasonable size and cost the curve record cannot be read with the precision desirable for some applications.

As well understood in the art a demand recorder may be operated directly by a measuring unit such as a watt-hour meter or it may be operated by pulses or impulses derived from the measuring unit. In the embodiment herein described it will be assumed that the demand recorder is operated by pulses or impulses.

The present invention comprises a new type of record and an instrument for producing such records. In accordance with the invention a chart record is produced which can be read with sufficient precision to show the power demand in each demand interval except for say the final two significant figures. Adjacent to each curve of the chart these two significant figures for the associated curve are printed.

One object of my invention is accordingly to provide a novel type of record for depicting the maximum demand of a variable quantity.

Another object is to provide a novel apparatus for producing a record of the type just mentioned.

Other objects of the invention will become apparent to those skilled in the art on reading the following description taken in connection with the drawings in which FIGURE 1 shows a small portion of a record produced in accordance with this invention and FIG. 2 is a view in perspective with parts broken away and parts shown schematically of an instrument arrangement capable of producing records of the FIGURE 1 type.

Referring in detail to FIGURES 1 and 2 reference number 1 denotes a chart which may be made of paper. As shown particularly in FIG. 2 the chart has a conventional row of feed holes 1A and 1B along each longitudinal margin and is fed from a conventional supply roll (not shown) to a takeup roll (not shown) by a guide roller 2 and a feed roller 3 each having sprocket pins for reception in the holes of the chart.

Longitudinally spaced time divisions are printed on the chart. For example in FIG. 2 the time divisions 8 a.m., 9 a.m. and 10 a.m. are printed along the left-hand margin of the chart. A plurality of longitudinally extending lines 5 are spaced uniformly along with the chart for the purpose of indicating amplitude values of curves drawn on the chart. Thus they are given values of 0, 100, 200, 300, 400 and 500 units respectively. As shown in FIGURE 1 individual lines may be located between each successive pair of the lines 5 for the purpose of further assisting in ascertaining the values of curves plotted on the chart 1.

Each demand reading is represented by a curve or horizontal line 6 which is drawn by a pen or marking member P. The chart remains stationary for the duration of each demand interval. At the end of the demand interval the chart is stepped in the direction of the arrow AR for the purpose of presenting a new portion of the chart to the pen P.

For example at 9 a.m. the pen P is positioned adjacent the point on the chart 1 which bears the marking 9 a.m. In this position the pen P is on the line 5 having zero value. For the duration of the demand interval the pen P then moves to the right as viewed in FIG. 2 in accordance with the consumption of electric energy by the load associated with the demand device. At the end of the demand interval the pen P is raised from the chart and returned to its zero position. In addition the chart is advanced one step in the direction of the arrow AR to prepare for the printing of the demand curve starting at 9:15 a.m.

To provide a more accurate reading of the demand a narrow blank strip 8 is provided on one side of the chart for receiving printed numbers each showing the exact position of the pen in a minor division of the chart. The actual demand reading would thus consist of the length of the demand line 6 across a chart plus a printed figure which is located adjacent such line. For example, in FIGURE 1 at 9 a.m. a line 6 indicates a demand of 390+ units. In the strip 8 adjacent such line 6 a number indicates that 2.5 units should be added to provide a resultant demand value of 392.5 units. With a chart 5" wide and divided into 50 divisions of 0.1 inch each, an accuracy in reading of ±2% is readily achieved. A number in the strip 8 which provides the last two significant figures of the reading makes it possible to obtain an overall accuracy of ±0.1% with no material increase in chart dimensions.

The pen P is mounted on a shaft P1 which has a pivot at each end. These pivots are received in bearings located in the legs of a resilient U-shaped bracket P2 which is secured to an arm 9. One end of the arm 9 is mounted for sliding movement along a rod 9A which is stationary. The remaining end of the arm 9 carries a half nut 9B which rests on a horizontal screw-threaded shaft 13. Thus as the shaft 13 rotates the pen P is moved in a horizontal path to record a horizontal line 6 on the chart 1. At the end of the demand interval the arm 9 is pivoted about the rod 9A to lift the half nut 9B from the screw-threaded shaft 13 sufficiently to permit a resetting of the arm 9 to its zero position along the left-hand edge of the chart 1.

A horizontal rod 11 extends parallel to the rod 9A and is located beneath the arm 9. This rod 11 has ends 11A and 11B bent at right angles and these ends are mounted for pivotal movement about the axis of the rod 9A. Such pivotal movement is effected by a solenoid 15 having an armature pivotally connected to the rod 11. When the solenoid is energized its armature lifts the rod 11 for the purpose of moving the pen P away from the chart 1 and moving the half nut 9B away from the threaded shaft 13. The arm 9 is biased towards its zero position by means of a flexible cord 17 having a spring wind-up device 17A.

The screw-threaded shaft 13 is rotated about its axis in accordance with pulses or impulses received from a watt-hour meter W. Such rotation may be effected by a stepping motor 19 which rotates the screw-threaded shaft 13 through a predetermined angular distance for each pulse or impulse applied to the motor.

Although the recording device may be employed for recording demand of energy supplied over any desired electrical circuit such as a polyphase circuit, it will be assumed that the device is employed for measuring the demand of a single-phase alternating-current circuit operating at a frequency of 60 cycles per second and represented by conductors L1 and L2. The watt-hour meter W is employed for transmitting pulses to the stepping motor 19 at a rate dependent upon the magnitude of the power being supplied over the conductors L1 and L2. The watt-hour meter includes current poles W1 and W2 which are spaced from a voltage pole W3 to define an air gap. The voltage pole W3 has a voltage winding across the conduction L1 and L2. The current poles have current windings connected for current flowing in the conductor L1. An electroconductive armature in the form of a disc W4 is mounted for rotation about its vertical axis by means of a shaft W5. A portion of the disc is located in the air gap defined by the poles and is subjected to a shifting magnetic field which is dependent in magnitude on the power being supplied over the conductors L1 and L2. Rotation of the disc is damped by means of a permanent damping magnet W6 having an air gap within which a portion of the disc W4 is located.

Rotation of the shaft W5 successively closes contacts W7 and W8. Each closure of a set of the contacts W7 or W8 connects a battery B across the terminals of the stepping motor 19 through back contacts 23-1 and 23-2 of a relay 23. The contacts 23-1 and 23-2 are closed as long as the relay 23 is deenergized and dropped out.

In order to print numbers on the strip 8, a printing drum or type wheel 25 is arranged to make one rotation for each movement of the pen P for the distance of one minor division of the chart scale. In the specific embodiment of FIG. 2 the type wheel is mounted directly on the shaft 13. The pitch of the threads of the shaft 13 is selected to advance the pen P for a distance equal to one minor division of the chart scale for each rotation of the shaft. It will be recalled that for a 5″ chart a minor division may have a dimension of the order of 0.1 inch.

It will be assumed that 20 pulses applied to the stepping motor 19 effect one rotation of the shaft 13 and thus advance the pen P for a distance equal to one minor division of the chart. Such a minor division may represent 10 units of demand. The type wheel 25 has 20 type numbers distributed uniformly around its periphery and increasing in steps of one-half unit from zero to a maximum of 9.5.

During its travel from the guide roller 2 to the feed roller 3 the chart 1 passes over a table 27 which supports the portion of the chart which receives an ink line from the pen P. This table 27 has a notch for receiving a platen 29 located below the type wheel 25. An ink ribbon 31 is located between the type wheel 25 and the chart 1. This ink ribbon may be advanced in a manner well understood in the art. When a number carried by the type wheel is to be printed on chart 1 the platen 29 is raised to force the portion of the chart thereabove together with the ink ribbon 31 towards the type wheel 25 to receive an impression from the type wheel.

The platen 29 is carried by a lever 33 which is mounted for rotation about a stationary shaft 35. The lever 33 is biased by means of a spring 37 towards a position wherein the platen 29 is slightly out of engagement with the chart. A solenoid 39 has an armature pivotally connected to the righthand end of the lever 33. When the solenoid is energized it rotates the lever 33 in a counterclockwise direction as viewed in FIG. 2 about the shaft 35 against the bias of the spring 37. When the solenoid is deenergized the spring 37 urges the lever 33 in a clockwise direction and the resultant blow by the platen 29 prints on the chart 1 the number corresponding to the position of the type wheel 25. The kinetic energy of the platen 29 carries it through its rest position and thereafter the platen is returned to its rest position by the spring 37.

At the end of each demand interval the chart 1 is advanced one step by means of a stepping motor 41. In the specific embodiment of FIG. 2 the stepping motor includes a ratchet wheel 43 which is secured to the shaft of the feed roller 3. A solenoid 45 has an armature which is biased downwardly as viewed in FIG. 2 by means of a spring 47. At its opposite end the armature carries a pawl 49 which is pivoted to the armature and which is biased towards the ratchet wheel 43, by means of a spring 51.

When the solenoid 45 is energized its armature is raised as viewed in FIG. 2 to charge on tension the spring 47. When the solenoid is deenergized the spring 47 urges the armature in a downward direction. During such downward movement of the armature the pawl 49 engages a tooth of the ratchet wheel to advance the feed roller 3 and the chart 1 by one step.

It will be recalled that during a resetting operation the pen P is returned to its zero position. At the same time the type wheel 25 is rotated to its zero position. Such zero position of the type wheel 25 is indicated by the opening of a switch 51 which is operated by a cam 53 mounted on the shaft 13.

Resetting and printing operations are supervised by a time switch TS having two sets of contacts TS1 and TS2. During a demand interval the contacts TS1 are closed and the contacts TS2 are open. At the end of each demand interval the contacts TS1 are briefly opened and the contacts TS2 are briefly closed. This time switch operation may be effected by any suitable apparatus. For illustrative purposes it is assumed that the switch TS is operated by a cam 55 which is rotated by a synchronous clock motor 57. This motor is shown as energized from the conductors L1 and L2.

In describing the overall operation of the device it will be assumed that at 10 a.m. the pen P is in its zero position and the half nut 9B is in threaded engagement with the threads of the shaft 13. The time switch TS is in its lower position as viewed in FIG. 2 wherein the contacts TS1 are closed to energize the solenoid 39 and the contacts TS2 are opened to deenergize the solenoids 15, 23, and 45. Inasmuch as solenoid 39 is energized, the platen 29 is spaced appreciably from the chart 1 and the spring 37 is prepared to produce a printing operation when required.

Inasmuch as the shaft W5 of the watt-hour meter W rotates in accordance with the magnitude of the power being transmitted over the conductors L1 and L2, pulses are developed by the switches W7 and W8 which are applied to the stepping motor 19. Consequently the stepping motor rotates the shaft 13 to advance the pen P across the chart at a rate dependent upon the power supplied over the conductors L1 and L2. The pen P thus draws the curve or line 6 which starts at the 10 a.m. position of the chart. This operation continues for the duration of the demand interval which is assumed to be 15 minutes.

At the end of the demand interval the time switch TS is operated to open the switch TS1 and to close the contacts TS2. In opening, the contacts TS1 deenergize the solenoid 39 and the spring 37 thereupon forces the platen 29 towards the type wheel 25 for the purpose of printing upon the chart 1 a number corresponding to the position of the type wheel 25. Following such printing operation the platen 29 returns to its rest position where it is slightly spaced from the chart 1.

Closing of the contacts TS2 energizes the solenoid 15 for the purpose of raising the half nut 9B from the screw-threaded shaft 13. The spring-bias cord 17 then returns the pen P together with the associated arm 9 to a zero position. In addition closure of the contacts TS2 energizes the solenoid 45 to move the pawl 49 upwardly as viewed in FIG. 2 and to charge the spring 47. If the type wheel 25 is displaced from its zero position the contacts 51 are closed to complete with the now closed contacts TS2, an energizing circuit for the solenoid 23. This connects the stepping motor 19 across the conductors L1 and L2 through a resistor R1. The stepping motor now rotates the type wheel rapidly to its zero position at which time the switch 51 is opened by its cam 53 to deenergize the solenoid 23. This again connects the stepping motor 19 for energization from the watt-hour meter W.

Shortly thereafter the contacts TS1 close and the contacts TS2 open. Opening of the contacts TS2 deenergizes the solenoid 15 for the purpose of lowering the half nut 9B into engagement of the threaded shaft 13. Also the solenoid 45 is deenergized and the charged spring 47 thereupon pulls the pawl 49 downwardly as viewed in FIG. 2 for the purpose of advancing the chart 1 by one step. This would place the chart in a position to receive a demand line or curve starting at 10:15 a.m. on the chart. Closure of the contacts TS1 again moves the platen 29 away from the chart 1 in preparation for a subsequent printing operation. This sequence is repeated for each demand interval.

I claim as my invention:
1. In a recording electrical demand meter, a chart-table, a pen-arm supported on a hinge-rod parallel thereto, a pen carried by said pen-arm, means biasing said pen toward said chart table, a step-motor having a shaft carrying a print-wheel, a threaded shaft parallel to said chart table and driven through reduction gearing from said shaft, a half-nut attached to said pen-arm positioned to engage said threaded shaft, said print-wheel carrying consecutive numbers about its rim and positioned so that the nearest is just out of contact with said chart table, rollers positioned to draw a chart across said chart table, clock-means arranged to connect said step-motor to a first supply-source at the beginning of a predetermined time-period and to disconnect it therefrom at the end of said time-period, said clock-means acting at the end of said time-period also to move said pen-arm to separate said half-nut from said threaded-shaft and said pen from said chart table, said clock-means also having means acting to connect said step-motors to a second supply-source arranged to drive said step-motor shaft in the reverse direction from that due to said first supply source.

References Cited

UNITED STATES PATENTS

| 1,663,807 | 3/1928 | Maurer | 346—30 X |
| 1,792,319 | 2/1931 | Perkins | 346—113 X |
| 1,902,045 | 3/1933 | Pudelko | 346—30 |
| 2,005,108 | 6/1935 | Pudelko | 346—30 |
| 2,590,459 | 3/1952 | Pudelko | 346—30 |
| 3,017,770 | 1/1962 | Green | 346—115 X |
| 2,587,079 | 2/1952 | Woods et al. | 346—66 |

RICHARD B. WILKINSON, *Primary Examiner.*

J. W. HARTARY, *Assistant Examiner.*